(12) United States Patent
Kim

US011614173B2

(10) Patent No.: US 11,614,173 B2
(45) Date of Patent: Mar. 28, 2023

(54) MULTI-PASSAGE COOLANT VALVE

(71) Applicants: HYUNDAI MOTOR COMPANY, Seoul (KR); KIA MOTORS CORPORATION, Seoul (KR)

(72) Inventor: Yeonho Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 163 days.

(21) Appl. No.: 17/179,836

(22) Filed: Feb. 19, 2021

(65) Prior Publication Data

US 2022/0074510 A1  Mar. 10, 2022

(30) Foreign Application Priority Data

Sep. 9, 2020 (KR) .................. 10-2020-0115254

(51) Int. Cl.
| F16K 11/072 | (2006.01) |
| F01P 7/14 | (2006.01) |
| F16K 27/02 | (2006.01) |
| F16K 11/02 | (2006.01) |
| B60H 1/00 | (2006.01) |
| F16K 11/076 | (2006.01) |
| F01P 7/16 | (2006.01) |
| F16K 11/10 | (2006.01) |

(52) U.S. Cl.
CPC ............. F16K 11/072 (2013.01); F01P 7/14 (2013.01); B60H 1/00485 (2013.01); F01P 7/165 (2013.01); F01P 2007/146 (2013.01); F16K 11/02 (2013.01); F16K 11/076 (2013.01); F16K 11/10 (2013.01); F16K 27/0263 (2013.01)

(58) Field of Classification Search
CPC .... F16K 11/072; F16K 27/0263; F16K 11/02; F16K 11/10; F16K 11/076; F01P 7/14; F01P 2007/146; F01P 7/165; B60H 1/00485
See application file for complete search history.

(56) References Cited

U.S. PATENT DOCUMENTS

| 1,555,075 A | * | 9/1925 | Pownall ................. F25B 41/325 |
| | | | 137/15.01 |
| 2,700,984 A | * | 2/1955 | Gleasman ................ F15B 13/06 |
| | | | 251/102 |
| 2,940,473 A | * | 6/1960 | Smith .................... F16K 11/085 |
| | | | 137/883 |

(Continued)

FOREIGN PATENT DOCUMENTS

KR  2021-0000117 A  1/2021

*Primary Examiner* — Matthew W Jellett
*Assistant Examiner* — Christopher D Ballman
(74) *Attorney, Agent, or Firm* — McDonnell Boehnen Hulbert & Berghoff LLP

(57) ABSTRACT

A multi-passage coolant valve may include an outer housing including an outer body formed with a first outer inlet, a second outer inlet, a first outer outlet, and a second outer outlet, and an auxiliary body formed with a third outer outlet, and an inner housing rotatably provided in the outer housing. As the inner housing rotates by a predetermined angle, the first outer inlet and the first outer outlet are fluidly communicated with each other, the first outer inlet and the second outer outlet communicate with each other, and the second outer inlet and the third outer outlet communicate with each other.

12 Claims, 17 Drawing Sheets

(56) References Cited

U.S. PATENT DOCUMENTS

| | | | | |
|---|---|---|---|---|
| 2,996,083 A * | 8/1961 | Huska | F16K 11/085 | |
| | | | 137/625.11 | |
| 3,115,160 A * | 12/1963 | Rogers | F16K 11/076 | |
| | | | 137/625.23 | |
| 3,774,634 A * | 11/1973 | Bonney | F16K 11/072 | |
| | | | 251/283 | |
| 4,108,207 A * | 8/1978 | Doody | F16K 11/087 | |
| | | | 251/368 | |
| 4,115,276 A * | 9/1978 | Kelly | F16K 11/072 | |
| | | | 210/167.14 | |
| 4,371,003 A * | 2/1983 | Goguen | F16K 11/072 | |
| | | | 137/625.46 | |
| 4,480,662 A * | 11/1984 | Garrels | F16K 5/10 | |
| | | | 137/625.3 | |
| 4,968,334 A * | 11/1990 | Hilton | B01D 53/0407 | |
| | | | 96/124 | |
| 5,462,085 A * | 10/1995 | Iwata | F16K 3/08 | |
| | | | 137/614.21 | |
| 5,706,851 A * | 1/1998 | Lopez-Gomez | F16K 5/0407 | |
| | | | 137/340 | |
| 6,152,176 A * | 11/2000 | Lin | A61G 7/05776 | |
| | | | 137/625.21 | |
| 6,371,060 B1 * | 4/2002 | Lehmann | F16K 11/074 | |
| | | | 123/41.1 | |
| 6,539,899 B1 * | 4/2003 | Piccirilli | F01P 7/167 | |
| | | | 123/41.1 | |
| 6,920,845 B2 * | 7/2005 | Lelkes | F16K 11/074 | |
| | | | 123/41.01 | |
| 7,165,513 B2 * | 1/2007 | Humburg | B60H 1/00978 | |
| | | | 165/41 | |
| 7,191,797 B2 * | 3/2007 | Jensen | F16K 11/072 | |
| | | | 137/553 | |
| 7,426,939 B2 * | 9/2008 | Jorg | F16K 11/076 | |
| | | | 438/935 | |
| 7,506,664 B2 * | 3/2009 | Norris | F16K 11/0876 | |
| | | | 137/625.42 | |
| 8,393,305 B2 * | 3/2013 | Farkh | F16K 11/085 | |
| | | | 123/41.31 | |
| 8,678,030 B2 * | 3/2014 | Knodel | A21C 11/16 | |
| | | | 418/253 | |
| 8,919,425 B2 * | 12/2014 | Han | F16K 11/072 | |
| | | | 165/103 | |
| 9,279,506 B2 * | 3/2016 | Jensen | F16K 11/072 | |
| 9,493,932 B2 * | 11/2016 | Eckberg | F16K 11/085 | |
| 9,643,469 B2 * | 5/2017 | Kakehashi | H01M 10/625 | |
| 9,695,952 B2 * | 7/2017 | Lopez | F16K 27/04 | |
| 9,784,172 B2 * | 10/2017 | Tobergte | F01P 7/14 | |
| 9,856,987 B2 * | 1/2018 | Beall | F16K 27/041 | |
| 10,183,548 B2 * | 1/2019 | Enomoto | B60K 11/02 | |
| 10,302,603 B2 * | 5/2019 | Olovsson | F16K 11/076 | |
| 10,323,756 B2 * | 6/2019 | Wan | F16K 11/074 | |
| 10,344,877 B2 * | 7/2019 | Roche | B60L 58/26 | |
| 10,563,780 B2 * | 2/2020 | Leroyer | F16K 11/076 | |
| 10,570,921 B2 * | 2/2020 | Geffert | F04D 29/4293 | |
| 10,697,676 B2 * | 6/2020 | Klingemann | F16K 27/029 | |
| 10,711,903 B2 * | 7/2020 | Coretto | F16K 3/316 | |
| 10,788,135 B2 * | 9/2020 | Whitaker | F16K 11/0853 | |
| 10,865,668 B2 * | 12/2020 | Wong | F01L 7/02 | |
| 10,919,750 B2 * | 2/2021 | Carpino | B65B 3/12 | |
| 11,105,253 B2 * | 8/2021 | Lee | H05B 3/42 | |
| 11,168,797 B2 * | 11/2021 | Dragojlov | F16K 31/535 | |
| 11,247,528 B2 * | 2/2022 | Han | F16K 11/072 | |
| 11,325,444 B2 * | 5/2022 | Kim | B60H 1/00921 | |
| 2005/0092378 A1 * | 5/2005 | Wu | F16K 11/085 | |
| | | | 137/625.47 | |
| 2006/0118066 A1 * | 6/2006 | Martins | F16K 11/0856 | |
| | | | 123/41.08 | |
| 2006/0237359 A1 * | 10/2006 | Lin | F16K 11/085 | |
| | | | 210/438 | |
| 2010/0319796 A1 * | 12/2010 | Whitaker | F16K 11/085 | |
| | | | 137/625.46 | |
| 2013/0075642 A1 * | 3/2013 | Hervieux | F15B 13/0406 | |
| | | | 251/304 | |
| 2015/0354716 A1 * | 12/2015 | Morein | F16K 11/0853 | |
| | | | 137/625.47 | |

* cited by examiner

MULTI-PASSAGE COOLANT VALVE

CROSS REFERENCE TO RELATED APPLICATIONS

This application claims priority to and the benefit of Korean Patent Application No. 10-2020-0115254 filed in the Korean Intellectual Property Office on Sep. 9, 2020, the entire contents of which are incorporated herein by reference.

BACKGROUND

(a) Field

The present disclosure relates to a multi-passage coolant valve. More particularly, the present disclosure relates to a multi-passage coolant valve having a plurality of cooling passages for simplifying a heat pump system.

(b) Description of the Related Art

Generally, an air conditioning system for a vehicle includes an air conditioner device circulating a refrigerant in order to heat or cool an interior of the vehicle.

The air conditioner device, which is to maintain the interior of the vehicle at an appropriate temperature regardless of a change in an external temperature to maintain a comfortable interior environment, is configured to heat or cool the interior of the vehicle through heat exchange by an evaporator in a process in which a refrigerant discharged by driving of a compressor is circulated to the compressor through a condenser, a receiver drier, an expansion valve, and the evaporator.

That is, the air conditioner device lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, as interest in energy efficiency and an environmental contamination problem are increased day by day, there is a need for an environmentally friendly vehicle that is capable of substantially replacing an internal combustion engine vehicle, and the environmentally friendly vehicle is commonly divided into an electric vehicle that is driven by using a fuel cell or electricity as a power source and a hybrid vehicle that is driven by using an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling device, a heat pump system, and a battery cooling system should be configured using separate closed circuits, respectively, so as to prevent heat generation of the motor, an electrical component, and the battery including the fuel cells.

Accordingly, size and weight of a cooling module disposed at the front of the vehicle are increased, and a layout of connection pipes supplying a coolant or a refrigerant to each of the heat pump system, the cooling device, and the battery cooling system in an engine compartment becomes complicated.

In addition, since the battery cooling system warming or cooling the battery depending on a state of the vehicle is separately provided so that the battery exhibits optimal performance, a plurality of valves for connecting the respective connection pipes to each other are used, thereby increasing manufacturing cost of the vehicle.

The above information disclosed in this Background section is only for enhancement of understanding of the background of the disclosure and therefore it may contain information that does not form the prior art that is already known in this country to a person of ordinary skill in the art.

SUMMARY

An exemplary embodiment of the present disclosure provides multi-passage coolant valve capable of simplifying system layout and reducing manufacturing cost by forming a plurality of coolant flow passages through one coolant valve.

Another embodiment of the present disclosure provides multi-passage coolant forming a plurality of cooling passages in one coolant valve through simple control.

A multi-passage coolant valve according to an exemplary embodiment of the present disclosure may include an outer housing having an outer body formed with a first outer inlet, a second outer inlet, a first outer outlet, and a second outer outlet, and an auxiliary body formed with a third outer outlet, and an inner housing rotatably provided in the outer housing. As the inner housing rotates by a predetermined angle, the first outer inlet and the first outer outlet are fluidly communicated with each other, the first outer inlet and the second outer outlet communicate with each other, and the second outer inlet and the third outer outlet communicate with each other, the first outer inlet and the second outer outlet communicate with each other, and the second outer inlet and the first outer outlet communicate with each other, or the first outer inlet and the third outer outlet communicate with each other, the second outer inlet and the second outer outlet communicate with each other, and the second outer inlet and the first outer outlet communicate with each other.

A central chamber for installing the inner housing may be formed in the outer body, the auxiliary body forming an auxiliary chamber may be formed in a lateral side of the outer body, and a first auxiliary outlet and second auxiliary outlet may be formed between the central chamber and the auxiliary chamber.

The first outer inlet may be formed on an upper center of the outer body, the second outer inlet may be eccentrically formed with the first outer inlet at a predetermined distance on the outer body, the first outer outlet may be formed in a lateral side of the outer body, the second outer outlet may be disposed at a predetermined angle from the first outer outlet on the lateral side of the outer body, and the third outer outlet may be disposed at a predetermined angle from the second outer outlet on the lateral side of the auxiliary body.

The first auxiliary outlet may be formed 90 degrees apart from the first outer outlet in the circumferential direction, the second auxiliary outlet may be formed 90 degrees apart from the first auxiliary outlet in the circumferential direction, and the third outer outlet may be formed 90 degrees apart from the second auxiliary outlet in the circumferential direction.

The inner housing may include an inner body, a separation wall dividing the inner body into a first inner chamber and a second inner chamber, a first inner inlet formed in an upper center of the inner body and connected to the first outer inlet, a second inner inlet to a fourth inner inlet formed on an upper surface of the inner body and selectively connected to the second outer inlet, a first inner outlet formed in a lateral side of the inner body and connected to the first inner inlet, a second inner outlet formed in a lateral side of the inner body and communicated with the second inner inlet through the first inner chamber, a third inner outlet formed in a lateral side of the inner body and communicated with the third inner inlet through the second inner chamber, and a fourth inner outlet formed in a lateral side of the inner body and communicated with the fourth inner inlet through the second inner chamber.

The second inner inlet may be eccentrically formed apart from the first inner inlet at a predetermined distance on the first inner chamber, the third inner inlet may be formed 90 degrees apart from the second inner inlet in the circumferential direction on an upper portion of the second inner chamber, and the fourth inner inlet may be formed 90 degrees apart from the third inner inlet in the circumferential direction on an upper portion of the second inner chamber.

The first inner outlet to the fourth inner outlet may be formed 90 degrees apart from each other in the circumferential direction.

The first inner inlet and the first inner outlet may be communicated with each other through an inner connection conduit formed in the first inner chamber.

The inner housing may operate in a first mode to a fourth mode which rotates at 90 degree intervals inside the outer housing.

In the first mode, the first outer inlet may communicate with the first outer outlet through the first inner inlet and the second inner outlet, and the second outer inlet may be blocked from the second inner inlet to the fourth inner inlet, such that coolant flowing in the first outer inlet is discharged to the first outer outlet through the first inner inlet and the first inner outlet.

In the second mode, the first outer inlet may communicate with the second outer outlet through the first inner inlet, the first inner outlet, and the first auxiliary outlet, and the second outer inlet may communicate with the third outer outlet through the second inner inlet and the third inner outlet, such that coolant flowing in the first outer inlet may be discharged to the second outer outlet, and the coolant flowing in the second outer inlet may be discharged to the third outer outlet.

In the third mode, the first outer inlet may communicate with the second outer outlet through the first inner inlet, the first inner outlet, and the second auxiliary outlet, and the second outer inlet may communicate with the first outer outlet through the second inner inlet and the third inner outlet, such that coolant flowing in the first outer inlet may be discharged to the second outer outlet, and coolant flowing in the second outer inlet may be discharged to the first outer outlet.

In the fourth mode, the first outer inlet may communicate with the third outer outlet through the first inner inlet and the first inner outlet, the second outer inlet may communicate with the second outer outlet through the third inner inlet and the second auxiliary outlet, the second outer inlet may communicate with the third outer outlet through the third inner inlet and the fourth inner outlet, and such that coolant flowing in the first outer inlet may be discharged to the third outer outlet, and coolant flowing in the second outer inlet may be discharged to the first outer outlet and the second outer outlet.

The multi-passage coolant valve according to an exemplary embodiment of the present disclosure may further include an actuator generating power for rotating the inner housing, and an actuator housing accommodating the actuator by coupling with a lower portion of the outer housing.

The multi-passage coolant valve according to an exemplary embodiment of the present disclosure may further include a sealing member provided in the first outer inlet, the second outer inlet, the first outer outlet, the first auxiliary outlet, the second auxiliary outlet, the third outer outlet, and an inner side of the outer housing, respectively.

According to an exemplary embodiment of the present disclosure, a plurality of cooling passages may be formed between the outer housing and the inner housing according to rotation of the inner housing.

Also, since a plurality of cooling passage is formed by one coolant valve, it is possible to simplify overall structure of the heat pump system and reduce manufacturing cost of the vehicle.

In addition, since the inner housing rotates at predetermined angles and forms a plurality of cooling passages between the outer housing and the inner housing of the coolant valve can be controlled.

BRIEF DESCRIPTION OF THE FIGURES

In the following detailed description, only certain exemplary embodiments of the present disclosure have been shown and described, simply by way of illustration.

DETAILED DESCRIPTION

Figure 1:
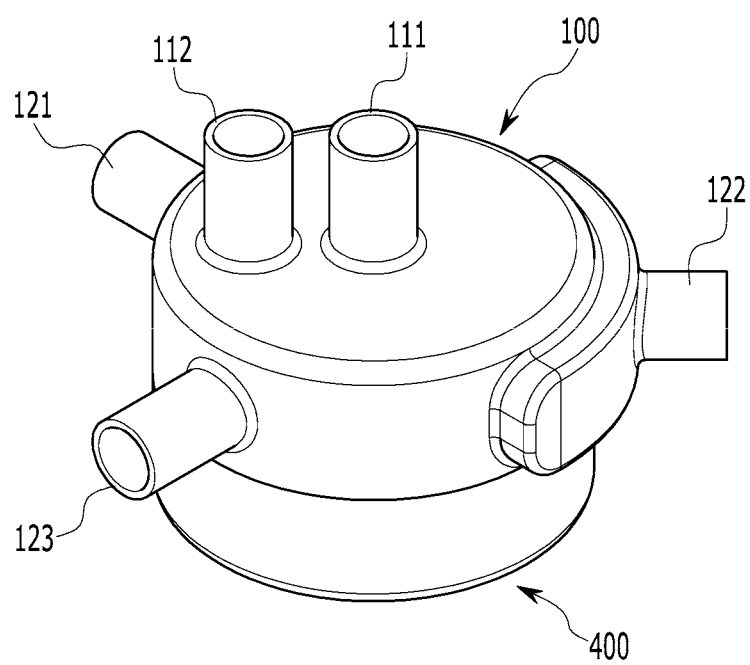
FIG. 1 is a perspective view illustrating a multi-passage coolant valve according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member", etc. used herein mean a unit of inclusive components performing at least one or more functions or operations.

Hereinafter, a multi-passage coolant valve according to an exemplary embodiment of the present disclosure will be described in detail with reference to accompanying drawings.

Figure 2:
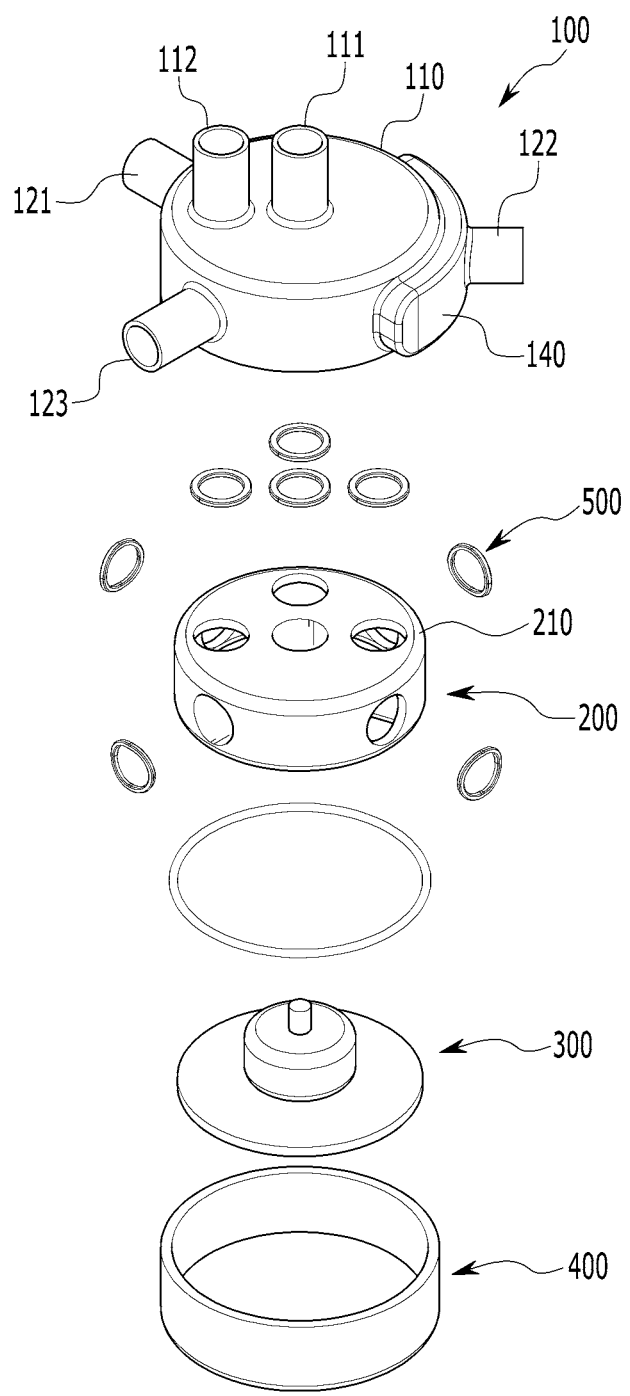
FIG. 2 is an exploded perspective view illustrating a multi-passage coolant valve according to an exemplary embodiment of the present disclosure.

FIG. 1 is a perspective view illustrating a multi-passage coolant valve according to an exemplary embodiment of the present disclosure. FIG. 2 is an exploded perspective view illustrating a multi-passage coolant valve according to an exemplary embodiment of the present disclosure.

As shown in FIG. 1 and FIG. 2, a multi-passage coolant valve according to an exemplary embodiment of the present disclosure may include an outer housing 100, and an inner housing 200 rotatably provided in the outer housing 100.

An actuator 300 is secured to a lower portion of the inner housing 200, and the actuator 300 generates power for rotating the inner housing 200. An actuator housing 400 is secured to a lower portion of the outer housing 100, and the actuator housing 400 accommodates the actuator 300.

In an exemplary embodiment of the present disclosure, since coolant flowing in inlets of the outer housing 100 are selectively discharged outside through the inner housing 200 by rotation of the inner housing 200 at 90 degree intervals, the actuator 300 may be implemented through a step motor or a solenoid to rotate the inner housing 200 at 90 degree interval.

The actuator housing 400 may be formed in a cylinder shape having an opening upper portion and empty inside to accommodate actuator 300, and accommodate the actuator 300 by coupling with the outer housing 100.

Hereinafter, the outer housing 100 and the inner housing 200 will be described in detail with reference to accompanying drawings.

Figure 3:
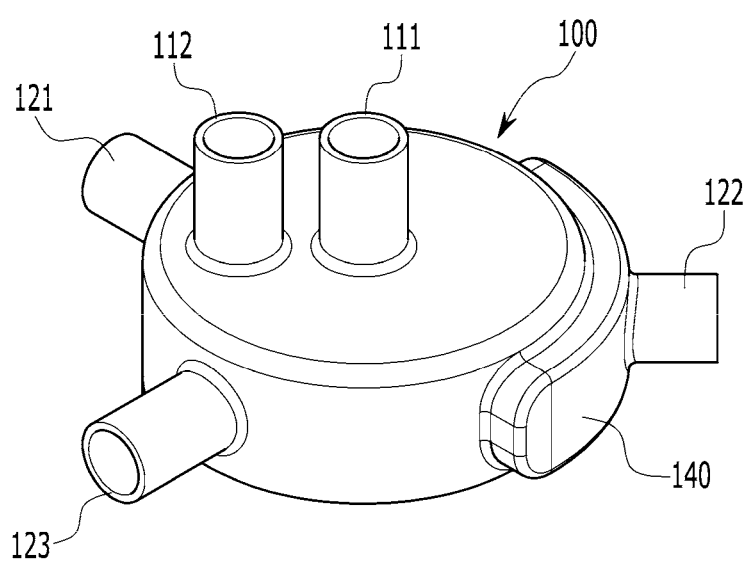
FIG. 3 is a perspective view illustrating an outer housing according to an exemplary embodiment of the present disclosure.
Figure 4:
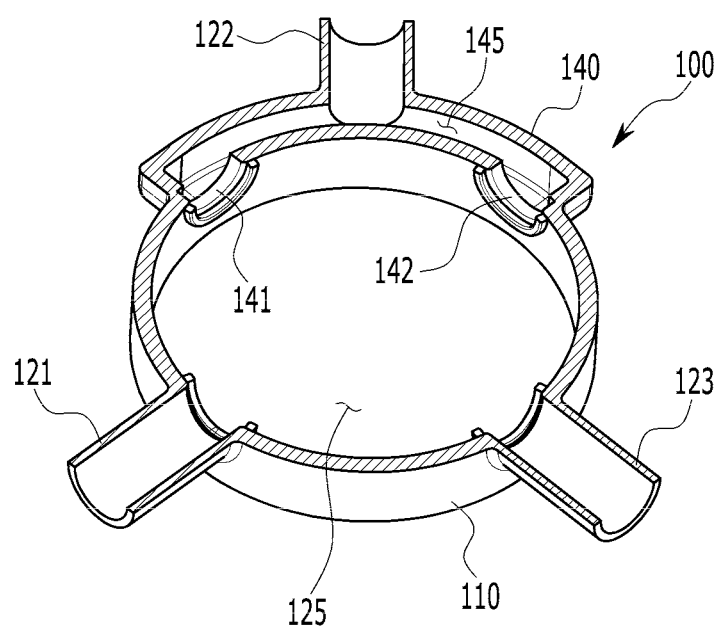
FIG. 4 is a partially cut-away perspective view illustrating an outer housing according to an exemplary embodiment of the present disclosure.

FIG. 3 is a perspective view illustrating an outer housing according to an exemplary embodiment of the present disclosure. FIG. 4 is a partially cut-away perspective view illustrating an outer housing according to an exemplary embodiment of the present disclosure.

Figure 5:
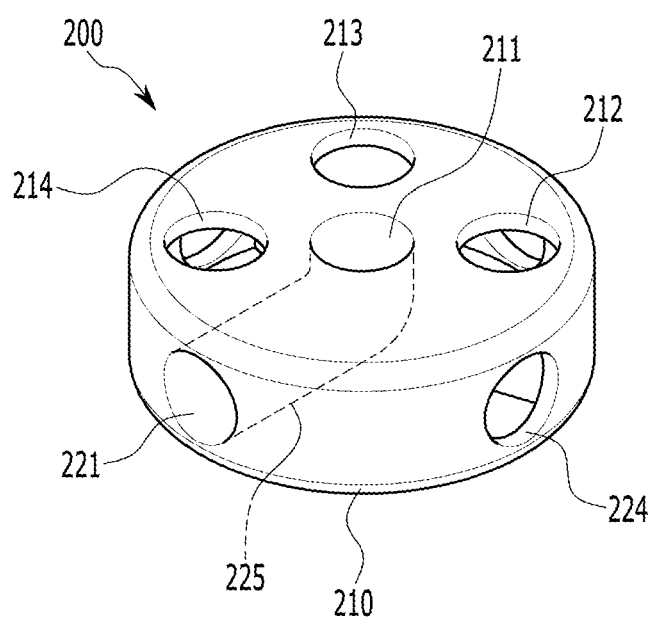
FIG. 5 is a perspective view illustrating an inner housing according to an exemplary embodiment of the present disclosure.

As shown in FIG. 3 to FIG. 5, the outer housing 100 may include an outer body 110 and an auxiliary body 140.

The outer body 110 is generally formed in a cylinder shape having a central chamber 125 therein, and a lower portion is opened thereof. The inner housing 200 is rotatably installed in the outer body 110. As described above, the inner housing 200 is rotated by power of the actuator 300 at a predetermined angle.

A first outer inlet 111 and a second outer inlet 112 are formed on an upper portion (e.g., upper surface). The first outer inlet 111 is formed on an upper center of the outer body 110, and the second outer inlet 112 is eccentrically formed with the first outer inlet 111 at a predetermined distance on an upper portion of the outer body The auxiliary body 140 protrudes from a lateral side of the outer body 110, and an auxiliary chamber 145 is formed between an exterior surface of the outer body 110 and the auxiliary body 140. A first outer outlet 121 and a second outer outlet 122 are formed in a lateral side of the outer body 110, and a third outer outlet 123 is formed in a lateral side of the auxiliary body 140.

A first auxiliary outlet 141 and a second auxiliary outlet 142 are formed between the outer body 110 and the auxiliary body 140 for communicating the central chamber 125 of the outer body 110 and the auxiliary chamber 145 of the auxiliary body 140 therewith.

The first outer outlet 121, the second outer outlet 122, the first auxiliary outlet 141, and the second auxiliary outlet 142 are formed 90 degrees apart with each other in a circumferential direction of the outer body 110, respectively. The second outer outlet 122 may be formed in a central portion between the first auxiliary outlet 141 and the second auxiliary outlet 142 on an exterior surface of the auxiliary body 140.

Figure 6:
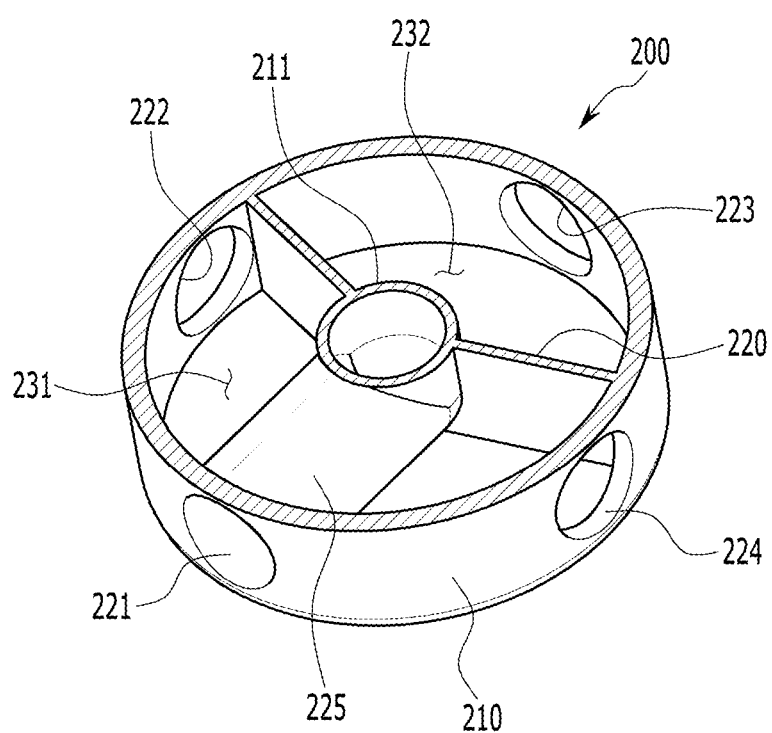
FIGS. 6, 7, and 8 are partially cut-away perspective views illustrating an inner housing according to an exemplary embodiment of the present disclosure.
Figure 7:
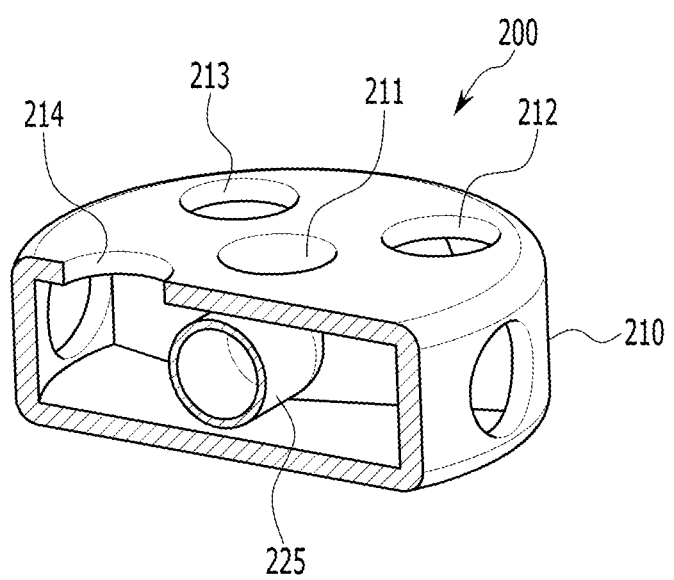
Figure 8:
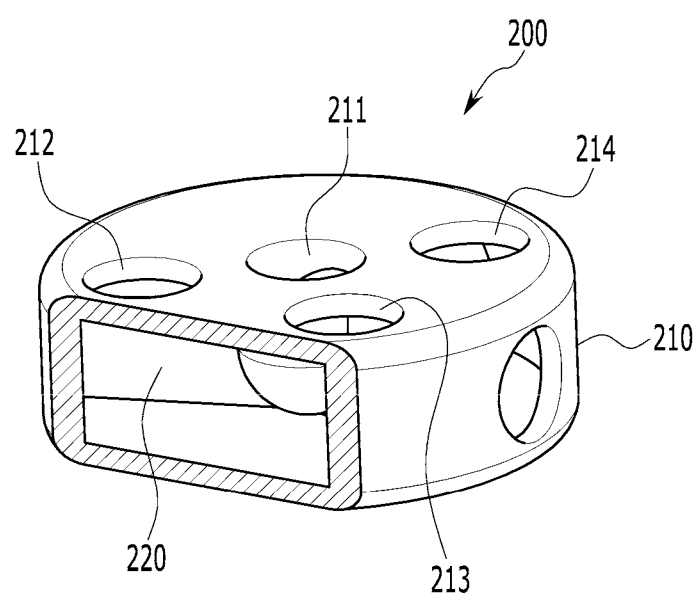
Figure 9:
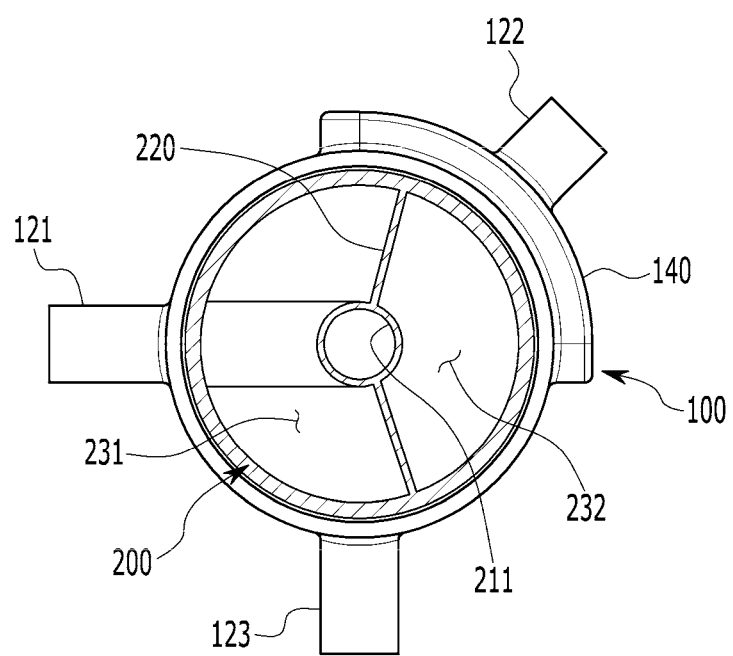
FIG. 9 is a partially cut-away perspective view illustrating a state in which an outer housing and an inner housing are assembled according to an exemplary embodiment of the present disclosure.

FIG. 5 is a perspective view illustrating an inner housing according to an exemplary embodiment of the present disclosure. FIG. 6 to FIG. 8 are partially cut-away perspective views illustrating an inner housing according to an exemplary embodiment of the present disclosure.

As shown in FIG. 6 to FIG. 9, the inner housing 200 may include an inner body 210 formed in a cylinder shape with an empty inside.

A separation wall 220 is formed in the inner body 210 for dividing an inside of the inner body 210 into a first inner chamber 231 and a second inner chamber 232.

A first inner inlet 211 is formed on an upper center of the inner body 210, and communicated with the first outer inlet 111.

A second inner inlet 212, a third inner inlet 213, and a fourth inner inlet 214 are formed on an upper portion (e.g., upper surface) of the inner body 210, and selectively communicated with the second outer inlet 112. The second inner inlet 212 to fourth inner inlet 214 may be formed 90 degree apart from each other in the circumferential direction.

For example, the second inner inlet 212 to fourth inner inlet 214 are disposed apart at 90 degree intervals along a predetermined direction (e.g., anticlockwise based on drawing) based on the second inner inlet 212.

In an exemplary embodiment of the present disclosure, in a state where the second inner inlet 212 and the second outer inlet 112 are connected thereto, the third inner inlet 213 may be formed 90 degrees apart from the second inner inlet 212 in anticlockwise, and the fourth inner inlet 214 may be formed 90 degrees apart from the third inner inlet 213 in anticlockwise.

Accordingly, the second inner inlet 212 to fourth inner inlet 214 are sequentially connected to the second outer inlet 112 as the inner housing 200 is rotated clockwise sequentially 90 degrees.

The first inner inlet 211 is formed on an upper center of the inner body 210 and always communicates with the first outer inlet 111 formed in the upper center of the outer body 110. That is, coolant flowing in the first outer inlet 111 always flows in the first inner inlet 211.

The second outer inlet 112 is selectively communicated with the second inner inlet 212 to fourth inner inlet 214 as the inner housing 200 is rotated in 90 degree intervals. That is, as the inner housing 200 rotates, coolant flowing in the second outer inlet 112 selectively inflows to the second inner inlet 212 to fourth inner inlet 214.

A first inner outlet 221, a second inner outlet 222, a third inner outlet 223, and a fourth inner outlet 224 are formed in a lateral side of the inner body 210. The first inner outlet 221 to fourth inner outlet 224 may be 90 degrees apart in the circumferential direction of the inner body 210. Referring to drawing, the second inner outlet 222 to the fourth inner outlet 224 are disposed apart at 90 degree intervals based on the first inner outlet 221.

The first inner inlet 211 is connected to the first inner outlet 221 through the inner connection conduit 225, such that the first inner inlet 211 and the first inner outlet 221 are always communicated with each other. That is, the coolant inflowing to the first outer inlet 111 is discharged to the first inner outlet 221 through the first inner inlet 211 and the inner connection conduit 225. At this time, the inner connection conduit 225 maybe installed inside the first inner chamber 231.

The second inner inlet 212 is formed on an upper surface of the inner body 210 and positioned above the first inner chamber 231 in order to communicate with the first inner chamber 231. The third inner inlet 213 and the fourth inner inlet 214 are formed on an upper surface of the inner body 210 and positioned above the second inner chamber 232 in order to communicate with the second inner chamber 232.

The second inner outlet 222 and the fourth inner outlet 224 are formed on a lateral side of the inner body 210 to communicate with the first inner chamber 231. The third inner outlet 223 is formed on a lateral side of the inner body 210 to communicate with the second inner chamber 232.

Referring to FIG. 2, sealing members 500 may be provided in an interior of the first outer inlet 111, an interior of the second outer inlet 112, an interior of the first outer outlet 121, an interior of the first auxiliary outlet 141, an interior of the second auxiliary outlet 142, an interior of the third outer outlet 123, and an interior of the outer body 110, respectively.

Accordingly, when the coolant inflowing to the first outer inlet 111 or the second outer inlet 112 of the outer housing 100 is discharged to any one of the first outer outlet 121 to third outer outlet 123 of the outer housing 100 passing through the inner housing 200, it prevents the coolant from leaking to unwanted paths.

Hereinafter, an operation of the multi-passage coolant valve according to an exemplary embodiment of the present disclosure will be described in detail with reference to accompanying drawings.

In an exemplary embodiment of the present disclosure, the inner housing 200 may be operated in four modes (first mode to fourth mode) rotating at 90 degree intervals. The inner housing 200 may be operated in any one of the four modes by power of the actuator 300.

The first mode to the fourth mode may mean a rotation position of the inner housing 200, the inner housing 200 is position in the second mode to the fourth mode as the inner housing 200 is rotated 90 degrees in clockwise direction based on the first mode.

In the first mode, the first inner outlet 221 of the inner housing 200 is connected to (or, fluidly communicated with) the first outer outlet 121 of the outer housing 100. In the second mode, the inner housing 200 is rotated 90 degree from the first mode in clockwise direction, such that the first inner outlet 221 of the inner housing 200 is connected to (or, fluidly communicated with) the second outer outlet 122 through the first auxiliary outlet 141 of the outer housing 100. In the third mode, the inner housing 200 is rotated 90 degree from the second mode in clockwise direction, such that the first inner outlet 221 of the inner housing 200 is connected to (or, fluidly communicated with) the second outer outlet 122 through the second auxiliary outlet 142. In the fourth mode, the inner housing 200 is rotated 90 degree from the third mode in clockwise direction, such that the first inner outlet 221 of the inner housing 200 is connected to (or, fluidly communicated with) the third outer outlet 123.

Figure 10A:
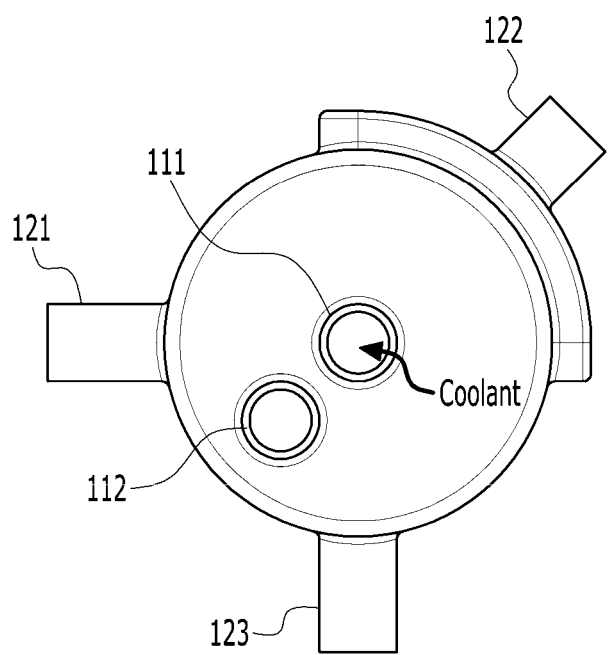
FIG. 10A to FIG. 10B are drawings for explaining an operation of a multi-passage coolant valve in a first mode according to an exemplary embodiment of the present disclosure.
Figure 10B:
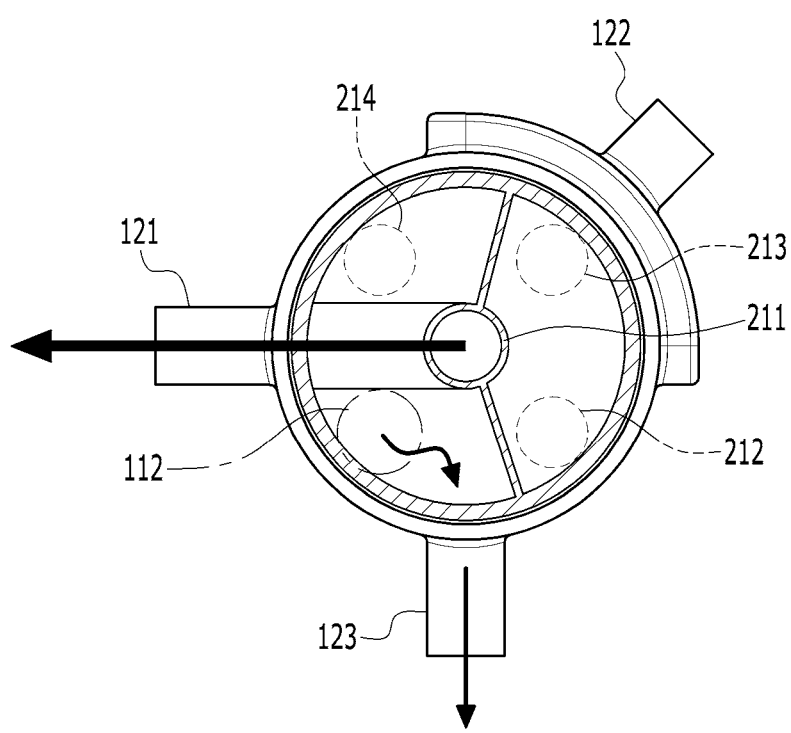

FIG. 10A to FIG. 10B are drawings for explaining an operation of a multi-passage coolant valve in a first mode according to an exemplary embodiment of the present disclosure.

Referring to FIG. 10A and FIG. 10B, in the first mode, the first outer inlet 111 of the outer housing 100 is connected to the first inner inlet 211 of the inner housing 200, and the first inner outlet 221 always connected to the first inner inlet 211 is connected to the first outer outlet 121 of the outer housing 100. The second outer inlet 112 of the outer housing 100 is not communicated with the second inner inlet 212 to the fourth inner inlet 214 of the inner housing 200.

Accordingly, the coolant inflowing to the first outer inlet 111 of the outer housing 100 is discharged to the first outer outlet 121 of the outer housing 100 passing through the first inner inlet 211 and the first inner outlet 221 of the inner housing 200.

However, the coolant inflowing to the second outer inlet 112 of the outer housing 100 does not flows in the inner housing 200 since the second outer inlet 112 does not connected to the second inner inlet 212 to the fourth inner inlet 214 of the inner housing 200.

That is, in first mode, only the coolant inflowing to the first outer inlet 111 is discharged to the first outer outlet 121, and the coolant inflowing to the second outer inlet 112 is not discharged to outlet of the outer housing 100, such that one cooling passage is formed.

Figure 11A:
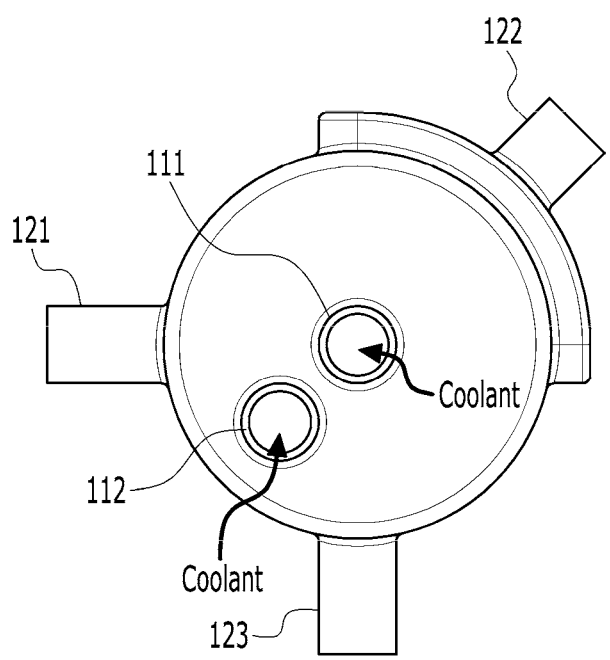
FIG. 11A to FIG. 11B are drawings for explaining an operation of a multi-passage coolant valve in a second mode according to an exemplary embodiment of the present disclosure.
Figure 11B:
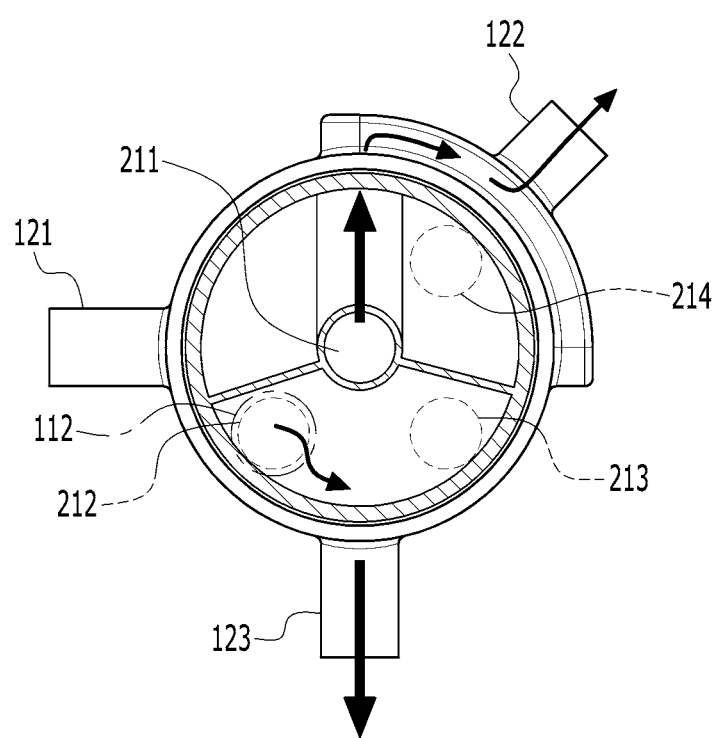

FIG. 11A to FIG. 11B are drawings for explaining an operation of a multi-passage coolant valve in a second mode according to an exemplary embodiment of the present disclosure.

Referring to FIG. 11A and FIG. 11B, in the second mode, the first outer inlet 111 of the outer housing 100 is connected to the first inner inlet 211 of the inner housing 200, and the first inner outlet 221 always connected to the first inner inlet 211 is connected to the second outer outlet 122 through the first auxiliary outlet 141 of the outer housing 100.

Accordingly, the coolant inflowing to the first outer inlet 111 of the outer housing 100 is discharged to the second outer outlet 122 of the outer housing 100 passing through the first inner inlet 211 of the inner housing 200, the first inner outlet 221 of the inner housing 200, the first auxiliary outlet 141 of the outer housing 100, and the auxiliary chamber 145 of the outer housing 100.

The second outer inlet 112 of the outer housing 100 is connected to the second inner inlet 212 of the inner housing 200, and the third inner outlet 223 of the inner housing 200 is connected to the third outer outlet 123 of the outer housing 100.

Accordingly, the coolant inflowing to the second outer inlet 112 of the outer housing 100 is discharged to the third outer outlet 123 of the outer housing 100 passing through the second inner inlet 212 of the inner housing 200, the second inner chamber 232 of the inner housing 200, and the third inner outlet 223 of the inner housing 200.

That is, in the second mode, the coolant inflowing to the first outer inlet 111 is discharged to the second outer outlet 122, and the coolant inflowing to the second outer inlet 112 is discharged to the third outer outlet 123, such that two cooling passage are formed.

Figure 12A:
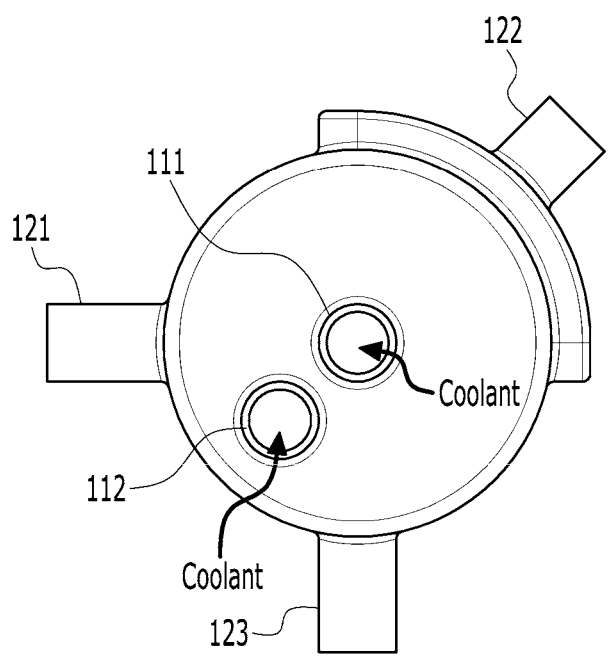
FIG. 12A to FIG. 12B are drawings for explaining an operation of a multi-passage coolant valve in a third mode according to an exemplary embodiment of the present disclosure.
Figure 12B:
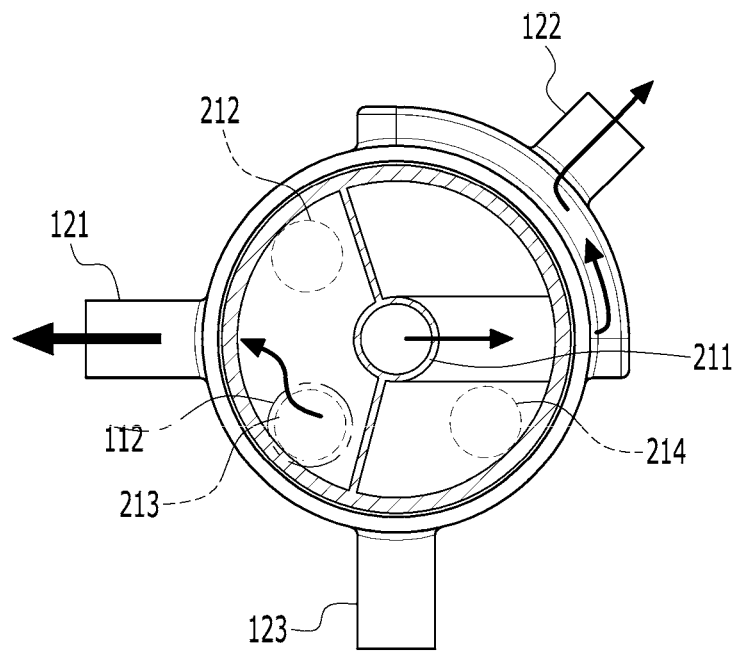

FIG. 12A to FIG. 12B are drawings for explaining an operation of a multi-passage coolant valve in a third mode according to an exemplary embodiment of the present disclosure.

Referring to FIG. 12A and FIG. 12B, in the third mode, the first outer inlet 111 of the outer housing 100 is connected to the first inner inlet 211 of the inner housing 200, and the first inner outlet 221 always connected to the first inner inlet 211 is connected to the second outer outlet 122 through the second auxiliary outlet 142 of the outer housing 100.

Accordingly, the coolant inflowing to the first outer inlet 111 of the outer housing 100 is discharged to the second outer outlet 122 of the outer housing 100 passing through the first inner inlet 211 of the inner housing 200, the first inner outlet 221 of the inner housing 200, the second auxiliary outlet 142 of the outer housing 100, and the auxiliary chamber 145 of the outer housing 100.

Further, the second outer inlet 112 of the outer housing 100 is connected to the third inner inlet 213 of the inner housing 200, and the third inner outlet 223 of the inner housing 200 is connected to the first outer outlet 121 of the outer housing 100.

Accordingly, the coolant inflowing to the second outer inlet 112 of the outer housing 100 is discharged to the first outer outlet 121 of the outer housing 100 passing through the third inner inlet 213 of the inner housing 200, the second inner chamber 232 of the inner housing 200, and the third inner outlet 223 of the inner housing 200.

That is, in the third mode, the coolant inflowing to the first outer inlet 111 is discharged to the second outer outlet 122, and the coolant inflowing to the second outer inlet 112 is discharged to the first outer outlet 121, such that two cooling passages are formed.

Figure 13A:
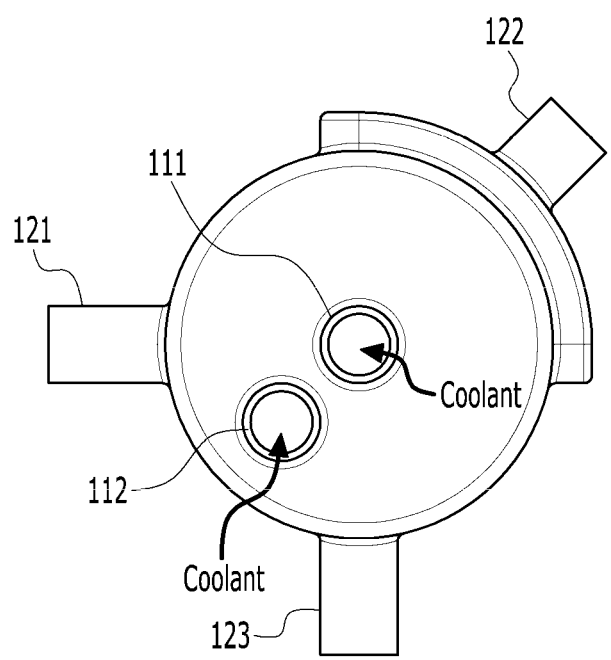
FIG. 13A to FIG. 13B are drawings for explaining an operation of a multi-passage coolant valve in a fourth mode according to an exemplary embodiment of the present disclosure.
Figure 13B:
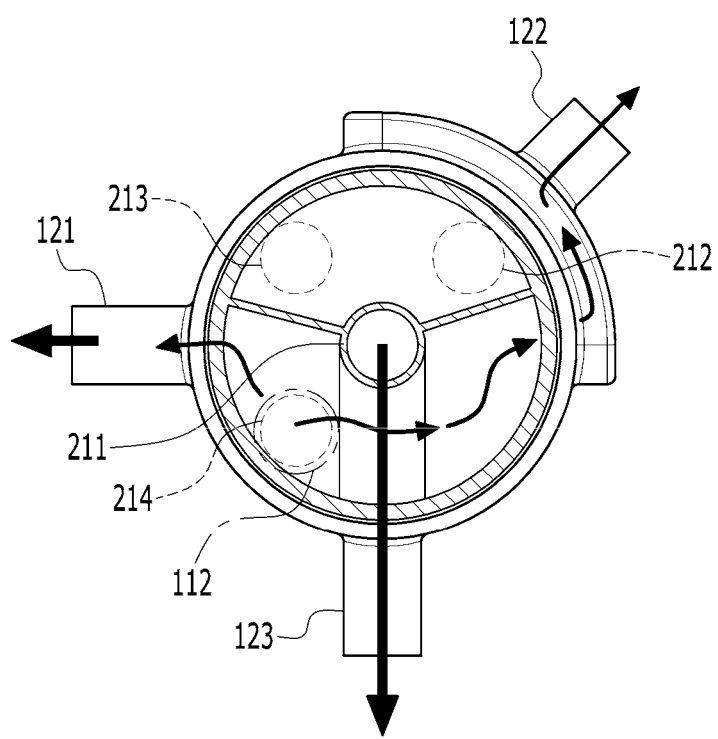

FIG. 13A to FIG. 13B are drawings for explaining an operation of a multi-passage coolant valve in a fourth mode according to an exemplary embodiment of the present disclosure.

Referring to FIG. 13A and FIG. 13B, in the fourth mode, the first outer inlet 111 of the outer housing 100 is connected to the first inner inlet 211 of the inner housing 200, and the first inner outlet 221 always connected to the first inner inlet 211 is connected to the third outer outlet 123 of the outer housing 100.

Accordingly, the coolant inflowing to the first outer inlet 111 of the outer housing 100 is discharged to the third outer outlet 123 of the outer housing 100 passing through the first inner inlet 211 of the inner housing 200 and the first inner outlet 221 of the inner housing 200.

Further, the second outer inlet 112 of the outer housing 100 is connected to the fourth inner inlet 214 of the inner housing 200, and the second inner outlet 222 of the inner housing 200 is connected to the second auxiliary outlet 142 of the outer housing 100, such that the second outer inlet 112 is fluidly communicated with the first outer outlet 121. The fourth inner outlet 224 of the inner housing 200 is connected to the second outer outlet 122 of the outer housing 100.

Accordingly, the coolant inflowing to the second outer inlet 112 of the outer housing 100 is discharged to the first outer outlet 121 of the outer housing 100 passing through the fourth inner inlet 214 of the inner housing 200, the first inner chamber 231 of the inner housing 200, and the second inner outlet 222 of the inner housing 200.

Also, the coolant inflowing to the second outer inlet 112 of the outer housing 100 is discharged to the second outer outlet 122 of the outer housing 100 passing through the fourth inner inlet 214 of the inner housing 200, the first inner chamber 231 of the inner housing 200, the fourth inner outlet 224 of the inner housing 200, the second auxiliary outlet 142 of the outer housing 100, and the auxiliary chamber 145 of the outer housing 100.

That is, in the fourth mode, the coolant inflowing to the first outer inlet 111 is exhausted to the third outer outlet 123, and the coolant inflowing to the second outer inlet 112 is exhausted to the first outer outlet 121 and the second outer outlet 122, such that three cooling passages are formed.

As described above, the multi-passage coolant valve according to an exemplary embodiment of the present disclosure may form a plurality of cooling passages between the outer housing and the inner housing according to rotation of the inner housing 200.

Also, since a plurality of cooling passage is formed by one coolant valve, it is possible to simplify overall structure of the heat pump system and reduce manufacturing cost of the vehicle.

In addition, since the inner housing 200 rotates at predetermined angles (e.g., 90 degrees) and forms a plurality of cooling passages between the outer housing and the inner housing, control of the coolant valve is facilitated.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:
1. A multi-passage coolant valve comprising:
an outer housing having an outer body formed with a first outer inlet, a second outer inlet, a first outer outlet, and a second outer outlet, and an auxiliary body formed with a third outer outlet; and
an inner housing rotatably provided in the outer housing;
wherein, as the inner housing rotates by a predetermined angle, the first outer inlet and the first outer outlet are fluidly communicated with each other;

wherein the first outer inlet and the second outer outlet communicate with each other, and the second outer inlet and the third outer outlet communicate with each other, or wherein the first outer inlet and the second outer outlet communicate with each other, and the second outer inlet and the first outer outlet communicate with each other, or wherein the first outer inlet and the third outer outlet communicate with each other, the second outer inlet and the second outer outlet communicate with each other, and the second outer inlet and the first outer outlet communicate with each other;

wherein the outer body includes a central chamber for installing the inner housing;

wherein the auxiliary body forming an auxiliary chamber is formed in a lateral side of the outer body;

wherein a first auxiliary outlet and a second auxiliary outlet are formed between the central chamber and the auxiliary chamber;

wherein the first outer inlet is formed on an upper center of the outer body;

wherein the second outer inlet is eccentrically formed with the first outer inlet at a predetermined distance on the outer body;

wherein the first outer outlet is formed in a lateral side of the outer body;

wherein the second outer outlet is disposed at a predetermined angle from the first outer outlet on the lateral side of the outer body;

wherein the third outer outlet is disposed at a predetermined angle from the second outer outlet on the lateral side of the auxiliary body;

wherein the first auxiliary outlet is formed 90 degrees apart from the first outer outlet in the circumferential direction;

wherein the second auxiliary outlet is formed 90 degrees apart from the first auxiliary outlet in the circumferential direction; and wherein the third outer outlet is formed 90 degrees apart from the second auxiliary outlet in the circumferential direction.

2. The multi-passage coolant valve of claim 1, wherein: the inner housing includes:
an inner body;
a separation wall dividing the inner body into a first inner chamber and a second inner chamber;
a first inner inlet formed in an upper center of the inner body and connected to the first outer inlet;
a second inner inlet to a fourth inner inlet formed on an upper surface of the inner body and selectively connected to the second outer inlet;
a first inner outlet formed in a lateral side of the inner body and connected to the first inner inlet;
a second inner outlet formed in a lateral side of the inner body and communicated with the second inner inlet through the first inner chamber;
a third inner outlet formed in a lateral side of the inner body and communicated with the third inner inlet through the second inner chamber; and
a fourth inner outlet formed in a lateral side of the inner body and communicated with the fourth inner inlet through the second inner chamber.

3. The multi-passage coolant valve of claim 2, wherein:
the second inner inlet is eccentrically formed apart from the first inner inlet at a predetermined distance on the first inner chamber;
the third inner inlet is formed 90 degrees apart from the second inner inlet in the circumferential direction on an upper portion of the second inner chamber; and
the fourth inner inlet is formed 90 degrees apart from the third inner inlet in the circumferential direction on an upper portion of the second inner chamber.

4. The multi-passage coolant valve of claim 2, wherein:
the first inner outlet, the second inner outlet, the third inner outlet, and the fourth inner outlet are formed 90 degrees apart from each other in the circumferential direction.

5. The multi-passage coolant valve of claim 1, wherein:
a first inner inlet and a first inner outlet communicate with each other through an inner connection conduit formed a first inner chamber.

6. The multi-passage coolant valve of claim 1, wherein:
the inner housing operates in a first mode to a fourth mode which rotates at 90 degree intervals inside the outer housing.

7. The multi-passage coolant valve of claim 6, wherein:
in the first mode, the first outer inlet communicates with the first outer outlet through the first inner inlet and the second inner outlet, and the second outer inlet is blocked from the second inner inlet to the fourth inner inlet,
such that coolant flowing in the first outer inlet is discharged to the first outer outlet through the first inner inlet and the first inner outlet.

8. The multi-passage coolant valve of claim 6, wherein:
in the second mode, the first outer inlet communicates with the second outer outlet through the first inner inlet, the first inner outlet, and the first auxiliary outlet, and
the second outer inlet communicates with the third outer outlet through the second inner inlet and the third inner outlet,
such that coolant flowing in the first outer inlet is discharged to the second outer outlet, and
the coolant flowing in the second outer inlet is discharged to the third outer outlet.

9. The multi-passage coolant valve of claim 6, wherein:
in the third mode,
the first outer inlet communicates with the second outer outlet through the first inner inlet, the first inner outlet, and the second auxiliary outlet, and
the second outer inlet communicates with the first outer outlet through the second inner inlet and the third inner outlet,
such that coolant flowing in the first outer inlet is discharged to the second outer outlet, and
coolant flowing in the second outer inlet is discharged to the first outer outlet.

10. The multi-passage coolant valve of claim 6, wherein:
in the fourth mode,
the first outer inlet communicates with the third outer outlet through the first inner inlet and the first inner outlet,
the second outer inlet communicates with the second outer outlet through the third inner inlet and the second auxiliary outlet,
the second outer inlet communicates with the third outer outlet through the third inner inlet and the fourth inner outlet, and
such that coolant flowing in the first outer inlet is discharged to the third outer outlet, and
coolant flowing in the second outer inlet is discharged to the first outer outlet and the second outer outlet.

11. The multi-passage coolant valve of claim 1, further comprising:
  an actuator generating power for rotating the inner housing; and
  an actuator housing accommodating the actuator by coupling with a lower portion of the outer housing.

12. The multi-passage coolant valve of claim 1, further comprising:
  a sealing member provided in the first outer inlet, the second outer inlet, the first outer outlet, the first auxiliary outlet, the second auxiliary outlet, the third outer outlet, and an inner side of the outer housing, respectively.

* * * * *